United States Patent
Boom et al.

(10) Patent No.: US 9,164,573 B2
(45) Date of Patent: *Oct. 20, 2015

(54) CONTROLLING AN ASYMMETRICAL PROCESSOR

(71) Applicant: Intel Corporation, Santa Clara, CA (US)

(72) Inventors: Douglas D. Boom, Portland, OR (US); Jordan J. Rodgers, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 13/785,115

(22) Filed: Mar. 5, 2013

(65) Prior Publication Data

US 2013/0346778 A1   Dec. 26, 2013

Related U.S. Application Data

(63) Continuation of application No. 13/528,444, filed on Jun. 20, 2012, now Pat. No. 8,943,343.

(51) Int. Cl.
*G06F 1/32*   (2006.01)

(52) U.S. Cl.
CPC .............. *G06F 1/3293* (2013.01); *G06F 1/32* (2013.01); *G06F 1/3225* (2013.01); *Y02B 60/121* (2013.01)

(58) Field of Classification Search
CPC ............................ G06F 1/3225; G06F 1/3293
USPC ......................................................... 713/320
See application file for complete search history.

(56) References Cited

U.S. PATENT DOCUMENTS

| | | | |
|---|---|---|---|
| 5,257,375 A | 10/1993 | Clark et al. | |
| 6,434,590 B1 | 8/2002 | Blelloch et al. | |
| 7,376,954 B2 | 5/2008 | Kissell | |
| 7,451,146 B2 | 11/2008 | Boehm | |

(Continued)

FOREIGN PATENT DOCUMENTS

| | | |
|---|---|---|
| WO | 2006/074027 | 7/2006 |
| WO | 2006/074027 | 8/2006 |

OTHER PUBLICATIONS

Wang, et al., "Helper Threads via Virtual Multithreading on an Experimental Itanium 2 Processor-based Platform," Oct. 9-13, 2004, pp. 144-155.

(Continued)

*Primary Examiner* — Albert Wang
(74) *Attorney, Agent, or Firm* — Trop, Pruner & Hu, P.C.

(57) ABSTRACT

In an embodiment, the present invention includes a multicore processor with a front end unit including a fetch unit to fetch instructions and a decode unit to decode the fetched instructions into decoded instructions, a first core coupled to the front end unit to independently execute at least some of the decoded instructions, and a second core coupled to the front end unit to independently execute at least some of the decoded instructions. The second core may have a second power consumption level greater than a power consumption level of the first core and also heterogeneous from the first core. The processor may further include an arbitration logic coupled to the first and second cores to enable the second core to begin execution responsive to a start processor instruction present in the front end unit. Other embodiments are described and claimed.

20 Claims, 8 Drawing Sheets

(56) References Cited

U.S. PATENT DOCUMENTS

| | | | |
|---|---|---|---|
| 2004/0215987 A1 | 10/2004 | Farkas et al. | |
| 2005/0081203 A1 | 4/2005 | Aguilar et al. | |
| 2006/0075404 A1 | 4/2006 | Rosu et al. | |
| 2006/0150184 A1 | 7/2006 | Hankins | |
| 2013/0275785 A1* | 10/2013 | Katori et al. | 713/320 |
| 2014/0173312 A1* | 6/2014 | Shippy, David J. | 713/323 |

OTHER PUBLICATIONS

Takao Moriyama, et al., "A Multiprocessor Resource Management Scheme Which Considers Program Grain Size," IPSJ Research Report, Jul. 18, 1990, vol. 90, N. 60, pp. 103-108.

Dai Honda, et al., "An Efficient Caching Technique Using Speculative Threads on Hyper-Threading Technology," IPSJ Research Report, Jul. 31, 2004, vol. 2004, No. 80, pp. 43-48.

Deborah T. Marr, et al., "Hyper-Threading Technology Architecture and Microarchitecture," Intel Technology Journal Q1, Feb. 14, 2002, vol. 6, Issue 2, pp. 4-15.

P. Agnihotri, et al., The Penn State Computing Condominium Scheduling System, Conference on Nov. 7-13, 1998, pp. 1-30.

S. Goel, et al., "Distributed Scheduler for High Performance Data-Centric Systems," IEEE Tencon 2003, pp. 1-6.

Chang-Qin Huang, et al., "Intelligent Agent-Based Scheduling Mechanism for Grid Service," Aug. 26-29, 2004, pp. 1-6.

Rakesh Kumar, et al., "Single-ISA Heterogeneous Multi-Core Architectures: The Potential for Processor Power Reduction," Dec. 2003, pp. 1-12.

Daniel Shelepov, et al., "HASS: A Scheduler for Heterogeneous Multicore Systems," 2009, pp. 1-10.

Tong Li, et al., "Operating System Support for Overlapping-ISA Heterogeneous Multi-core Architectures," date unknown, pp. 1-12.

Philip M. Wells, et al., "Dynamic Heterogeneity and the Need for Multicore Virtualization," 2007, pp. 1-10.

ARM Limited, White Paper, "Big.LITTLE Processing with ARM Cortex-A15 & Cortex-A7," Sep. 2011, 8 pages.

Nvidia, White Paper, "Variable SMP—A Multi-Core CPU Architecture for Low Power and High Performance," 2011, 16 pages.

International Patent Application No. PCT/US2011/068008, entitled "Providing an Asymmetric Multicore Processor System Transparently to an Operating System," by Boris Ginzburg, et al., filed Dec. 30, 2011.

International Patent Application No. PCT/US2012/035339, entitled "Migrating Tasks Between Asymmetric Computing Elements of a Multicore Processor," by Alon Naveh, et al., filed Apr. 27, 2012.

* cited by examiner

CONTROLLING AN ASYMMETRICAL PROCESSOR

This application is a continuation of U.S. patent application Ser. No. 13/528,444, filed Jun. 20, 2012, the content of which is hereby incorporated by reference.

BACKGROUND

Advanced processors commonly include multiple cores. Current processor offerings can be of dual-core, quad-core or many-core architectures. By providing multiple cores, greater processing power is realized. However, this comes at the cost of greater power consumption. Typically, the multiple cores of a multicore processor are of a homogeneous design and thus all have the same power consumption. While different cores can be enabled or disabled based on workload to reduce power consumption, there is typically not an ability to otherwise control power consumption by controlling the type of components that are available.

DETAILED DESCRIPTION

In various embodiments, an asymmetric processor may be provided that includes resources of heterogeneous types. Different ones of these resources can be selectively enabled or disabled to handle a current workload on the processor as well as to balance tradeoffs with regard to power versus performance. For example, the heterogeneous resources can be cores of different power consumption levels where a first core is of a first (low) power consumption level and a second core is of a second, higher power consumption level. In some embodiments, the first core may always be enabled to handle workload processing. However, when high performance needs are present, such as for performing certain workloads, the second core can also be powered on to aid in processing. Although described herein with reference to cores of heterogeneous types, understand the scope of the present invention is not limited in this regard and other types of heterogeneous resources within a processor may be present and selectively enabled or disabled.

Note that these cores can have heterogeneous capabilities, for example, with the same instruction set architectures (ISAs) but differing power/performance capabilities such as by way of different micro-architectures such as a larger, out-of-order core type and a smaller, in-order core type. It is possible also to provide cores of different ISAs that have different power/performance capabilities.

Asymmetrical processing in accordance with an embodiment of the present invention may be used in various platforms such as servers, desktop computers, notebooks, Ultrabooks™, tablet computers, smartphones and other mobile computing platforms. In this way battery life can be enhanced using a low power processor. For many tasks the processing capability of the low power core may be sufficient. However, for other tasks like video, encryption/decryption and other millions of instructions per second (MIPS)-hungry applications, the high power asymmetrical core may be enabled. Thus using an asymmetrical processor in accordance with an embodiment of the present invention the low power core may be doing most of the work, and occasionally turning on the high power core so that a user can have a seamless, high quality experience. In various use cases from server to mobile device, a low power low heat primary core may be always on for quicker demand, and a higher power, higher heat secondary core may be active when enabled for a given workload.

Figure 1:
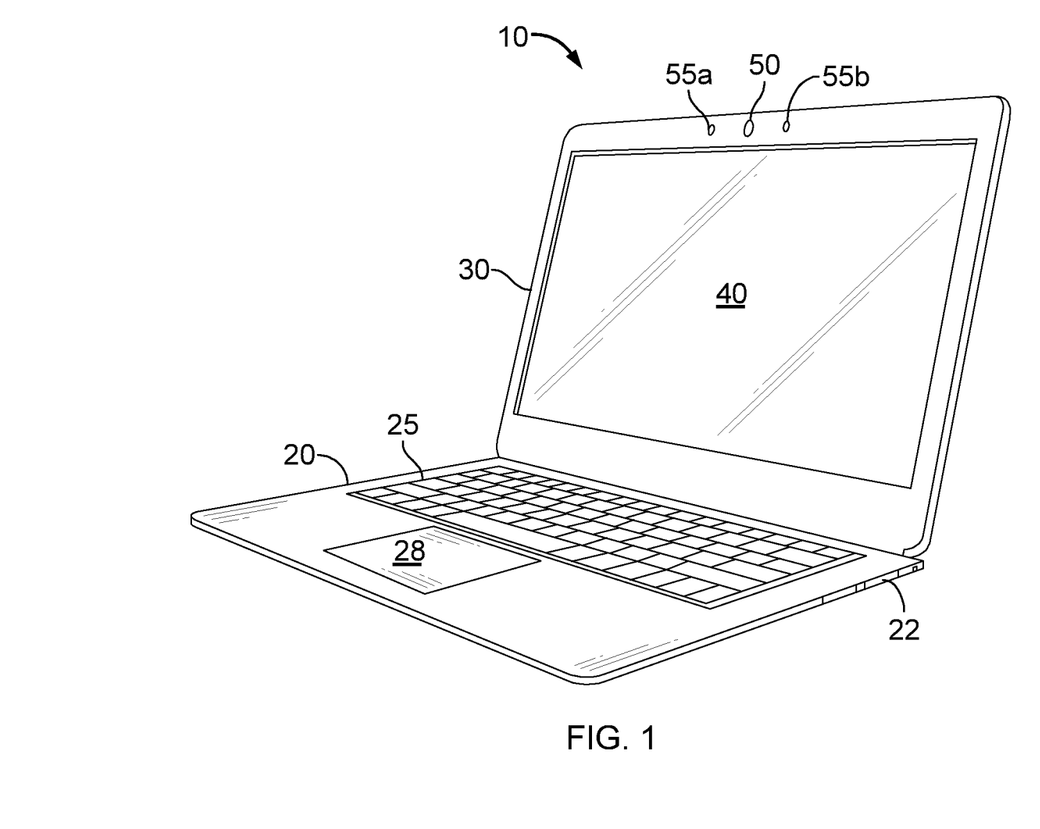
FIG. 1 is an illustration of a laptop computer in accordance with an embodiment of the present invention.

Referring now to FIG. 1, shown is an illustration of a laptop computer in accordance with an embodiment of the present invention. Various commercial implementations of system 10 can be provided. For example, system 10 can correspond to an Ultrabook™, an Apple MacBook Air™, or another ultralight and thin laptop computer (generally an ultrathin laptop). Further, as will be described herein, in some embodiments this laptop computer can be configurable to be convertible into a tablet computer.

With reference to FIG. 1, system 10 includes a base portion 20 which may be configured via a lightweight chassis that can include substantially all of the electronics circuitry of the system. For user interfaces, a keyboard 25 and a touchpad 28 may be provided in base portion 20. In addition, various ports for receiving peripheral devices, such as universal serial bus (USB) ports (including a USB 3.0 port), a Thunderbolt™ port, video ports such as a micro high definition media interface (HDMI) or mini video graphics adapter (VGA), memory card ports such as a SD card port, and audio jack, among others may be present, generally indicated at location 22 on a side of the chassis (other user-accessible ports can be present on the opposing chassis side). In addition, a power port may be provided to receive DC power via an AC adapter (not shown in FIG. 1).

As further seen, a lid portion 30 may be coupled to base portion 20 and can include a display 40, which in different embodiments can be a liquid crystal display (LCD) or an organic light emitting diode (OLED). Furthermore, in the area of display 40, touch functionality may be provided such that a user can provide user input via a touch panel co-located with display 40. Lid portion 30 may further include various capture devices, including a camera device 50, which may be used to capture video and/or still information. In addition, dual microphones $55_a$ and $55_b$ may be present to receive user input via the user's voice. Although shown at this location in FIG. 1, the microphone, which can be one or more omnidirectional microphones, may be in other locations.

As will be described further below, system 10 may be configured with particular components and circuitry to enable a high end user experience via a combination of hardware and software of the platform. For example, using available hardware and software, perceptual computing can enable a user to interact with the system via voice, gesture, touch and in other ways. In addition, this user experience can be delivered in a very light and thin form factor system that provides high performance and low-power capabilities while also enabling advanced features such as instant on and instant connect so that the system can be placed into low power, e.g., sleep mode and directly awaken and be available to the user instantly (e.g., within two seconds of exiting the sleep mode). Furthermore upon such wake-up the system may be connected to networks such as the Internet, providing similar performance to that available in smartphones and tablet computers, which lack the processing and user experience of a fully featured system such as that of FIG. 1. Of course, although shown at this high level in the illustration of FIG. 1, understand that additional components are present within the system, such as loud speakers, additional displays, capture devices, environmental sensors and so forth, details of which are discussed further below.

Figure 2:
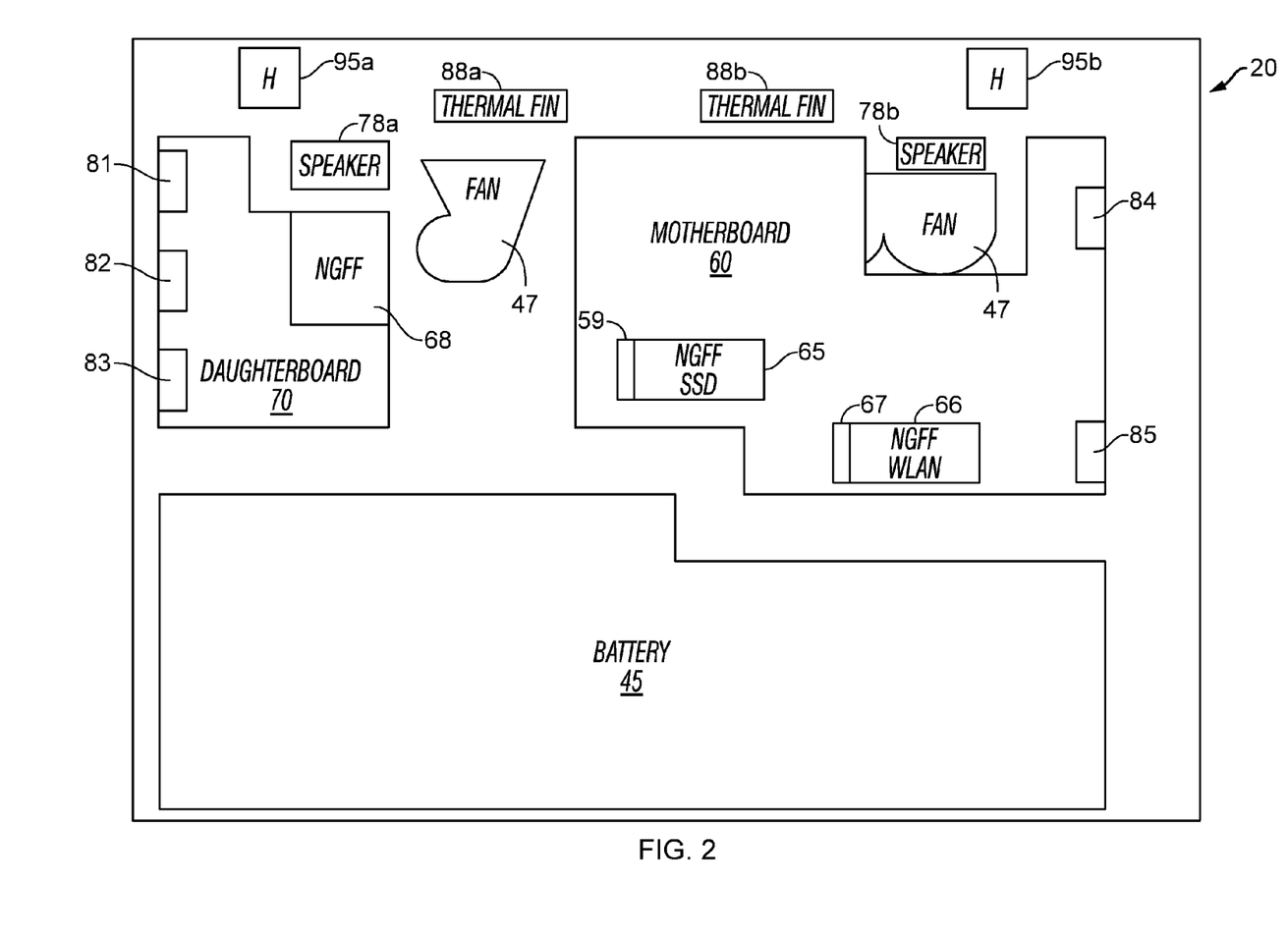
FIG. 2 is a top view of the placement of certain components within a base portion of a chassis in accordance with an embodiment of the present invention.

Referring now to FIG. 2, shown is a top view of the placement of certain components within a base portion of a chassis in accordance with an embodiment of the present invention. As shown in FIG. 2, base portion 20 can include substantially all of the electronics of the system, other than those associated with the display panel and any touch screen. Of course, the view shown in FIG. 2 is an example only and understand that different arrangements of components, including different components, different sizes and locations of components and other placement issues can certainly occur in other embodiments.

In general, the view in FIG. 2 is of the components within a chassis, other than a keyboard and touch pad which would generally be adapted over the components shown in FIG. 2 (with the keyboard over an upper portion of the view in FIG. 2, and the keypad generally in a lower and central portion of the view in FIG. 2).

Much of the circuitry of the system can be implemented on a motherboard 60 which can include various integrated circuits (ICs) and other circuitry including a processor such as a central processing unit (CPU), system memory and other ICs. Additional ICs and other circuitry can be implemented on a daughterboard 70 that may couple to motherboard 60. Daughterboard 70 can include interfaces to various ports and other peripheral connectors, including ports 81, 82 and 83 which may correspond to, e.g., USB, Ethernet, Firewire, Thunderbolt, or any other type of user-accessible connection. As seen, an add-in card 68 may couple to daughterboard 70, e.g., via a next generation form factor (NGFF) connector. Such connector in accordance with a NGFF design may provide a single connection type that can be used for add-in cards of different sizes with potentially different keying structures to ensure only appropriate add-in cards are inserted into such connectors. In the embodiment shown, this add-in card 68 may include wireless connectivity circuitry, e.g., for 3G/4G/LTE circuitry.

Similarly, motherboard 60 may provide interconnection to certain other user accessible ports, namely ports 84 and 85. In addition, several add-in cards 65 and 66 may couple to motherboard 60. In the embodiment shown, add-in card 65 may include an SSD and can couple to motherboard via a NGFF connector 59. Add-in card 66 may include, e.g., wireless local area network (WLAN) circuitry and can also be connected via a NGFF connector 67.

To provide cooling, some implementations may include one or more fans. In the embodiment shown, two such fans 47 may be provided which can be used to conduct heat from the CPU and other electronics and out via thermal fins $88_a$ and $88_b$, e.g., to vents within the chassis or to the chassis directly. However other embodiments may provide for a fanless system where cooling can be achieved by a combination of reduction in power consumption of the CPU and other components, and heat dissipation elements to couple hot components to the chassis or other ventilation elements.

To provide for advanced audio features, multiple speakers $78_a$ and $78_b$ may be provided and which can radiate out from a top portion of the chassis via a mesh or other ventilated pattern to provide for an enhanced sound experience. To enable interconnection between base portion 20 and a lid portion (not shown for ease of illustration in FIG. 2), a pair of hinges $95_a$ and $95_b$ may be provided. In addition to providing hinge capabilities, these hinges may further include pathways to provide connections between circuitry within the lid portion and base portion 20. For example, wireless antennas, touch screen circuitry, display panel circuitry and so forth all can communicate via connectors adapted through these hinges. As further shown, a battery 45 may be present which can be a lithium-ion or other high capacity battery may be used. Although shown with this particular implementation of components and placement of circuitry in FIG. 2, understand the scope of the present invention is not limited in this regard. That is, in a given system design there can be trade offs to more efficiently consume the available X-Y space in the chassis.

Figure 3:
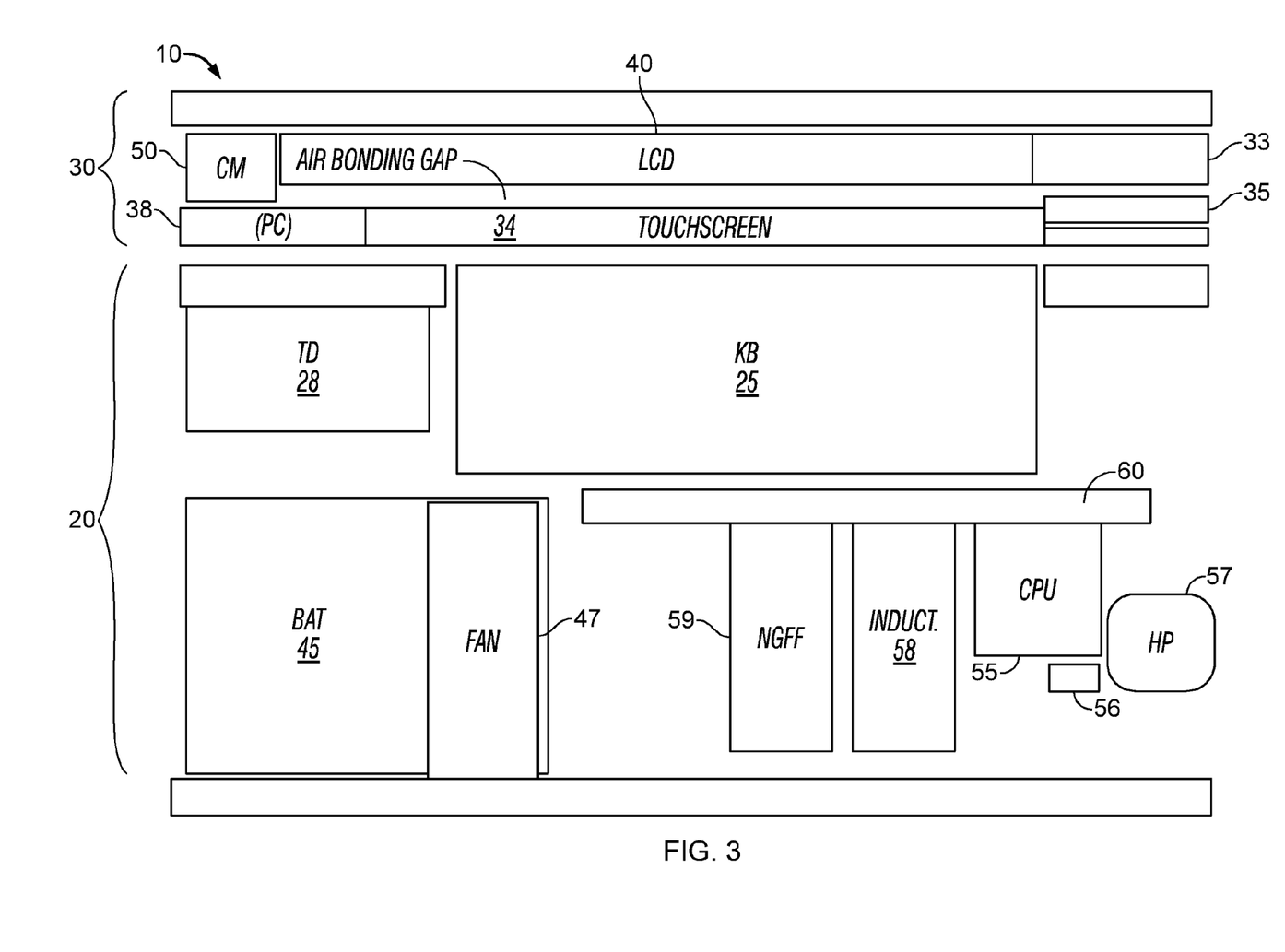
FIG. 3 is a cross-sectional view of a computer system in accordance with an embodiment of the present invention.

Referring now to FIG. 3, shown is a cross-sectional view of a computer system in accordance with an embodiment of the present invention. As shown in FIG. 3, system 10 may correspond to a clamshell-based ultrathin laptop computer having a low-profile and lightweight design. The view in FIG. 3 is a cross-sectional view through a substantial midpoint of the system and is intended to show a high level view of the vertical stack-up or layout of components within the chassis.

In general, the chassis may be split into a lid portion 30 and a base portion 20. In general, lid portion 30 may include the display and related circuitry and components, while base portion 20 may include the main processing elements along with battery and keyboard. However, note that in other implementations of a clamshell design, virtually all of the components other than the keyboard can be adapted within the lid portion to enable a detachable and removable lid portion that doubles as a tablet-based form factor computer.

With regard to lid portion 30, included is a display panel 40 which in an embodiment can be a LCD or other type of thin display such as an OLED. Display panel 40 may be coupled to a display circuit board 33. In addition, a touch screen 34 may be adapted above display panel 40 (when lid portion is in an open portion, but shown below display panel 40 in the illustration of FIG. 3). In an embodiment, touch screen 34 can be implemented via a capacitive sense touch array configured along a substrate, which can be a glass, plastic or other such transparent substrate. In turn, touch screen 34 can be coupled to a touch panel circuit board 35.

As further seen, also within lid portion 30 may be a camera module 50 which in an embodiment can be a high definition camera capable of capturing image data, both of still and video types. Camera module 50 can be coupled to a circuit board 38. Note that all of these components of lid portion 30 may be configured within a chassis that includes a cover assembly that can be fabricated from a plastic or metal material such as a magnesium aluminum (Mg—Al) composite.

Still referring to FIG. 3, the majority of the processing circuitry of system 10 may be present within base portion 20. However, as discussed above in an embodiment that provides for a detachable lid portion, virtually all of these components can instead be implemented in the lid portion.

From view of the top of base portion 20 down, included is a keyboard 25 that can be of various types to enable a thin profile device and can include chicklet type keys or other thin form factor keys. In addition, a touch pad 28 may provide another user interface.

The majority of the components can be configured on a circuit board 60 which may be a motherboard such as a Type IV motherboard that includes various integrated circuits that can be adapted to the circuit board in a variety of manners, including soldered, surface mounted and so forth. With specific reference to FIG. 3, a CPU 55, which may be an ultra low voltage multicore processor, can be adapted to circuit board 60, e.g., via a socket or other type of connection. As seen, to provide a thermal solution, a heat sink 56 may be placed in close relation to CPU 55 and can in turn be coupled to a heat pipe 57, which can be used to transfer heat from the processor and/or other components, e.g., to various cooling locations such as vents, fans or so forth. Also shown configured to circuit board 60 is an inductor 58 and a NGFF edge connector 59. Although not shown for ease of illustration, understand that an add-in card can be configured to connector 59 to provide additional components that can be configured for a particular system. As examples, these components can include wireless solutions and a solid state device (SSD), among other types of peripheral devices. Additional add-in cards may be provided in some implementations.

As further seen in FIG. 3, a battery 45 may further be configured within base portion 20 and may be located in close connection to a portion of the cooling solution which can be implemented in one embodiment by one or more fans 47. Although shown with this particular implementation in the example of FIG. 3, understand the scope of the present invention is not limited in this regard as in other embodiments additional and different components can be present. For example, instead of providing mass storage by way of an SSD, a hard drive can be implemented within base portion 40. To this end, a mini-serial advanced technology attach (SATA) connector can further be coupled to circuit board 60 to enable connection of this hard drive to the processor and other components adapted on circuit board 60. Furthermore, different locations of components can occur to more efficiently use (or reduce) the Z-space.

Figure 4:
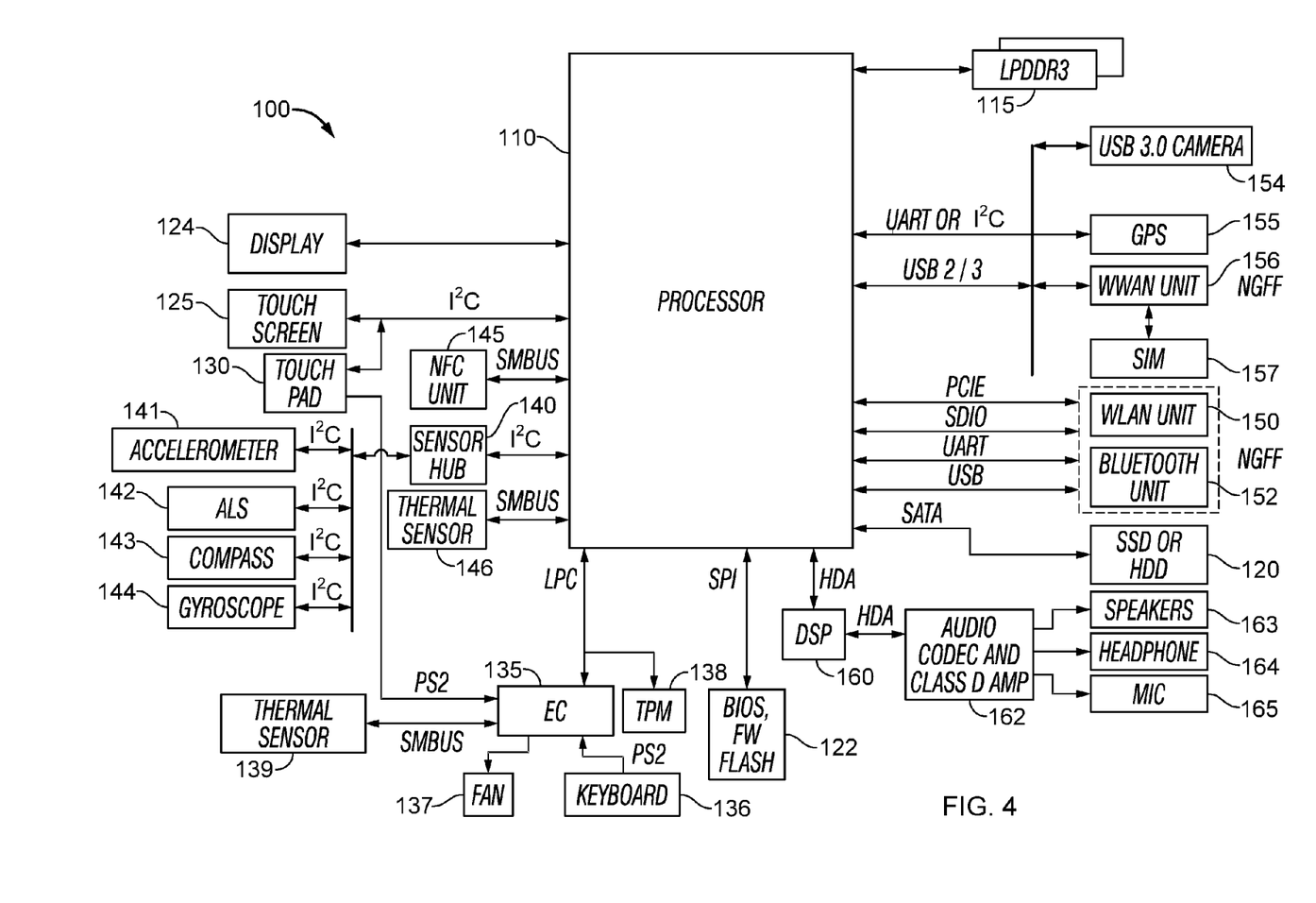
FIG. 4 is a block diagram of components present in a computer system in accordance with an embodiment of the present invention.

Referring now to FIG. 4, shown is a block diagram of components present in a computer system in accordance with an embodiment of the present invention. As shown in FIG. 4, system 100 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 4 is intended to show a high level view of many components of the computer system. However, it is to be understood that additional components may be present in certain implementations and furthermore, different arrangement of the components shown may occur in other implementations.

As seen in FIG. 4, a processor 110, which may be a low power multicore processor socket such as an ultra low voltage processor, may act as a main processing unit and central hub for communication with the various components of the system. Such processor can be implemented as a system on a chip (SoC). In one embodiment, processor 110 may be an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 processor. Certain details regarding the architecture and operation of processor 110 in one implementation will be discussed further below.

Processor 110 may communicate with a system memory 115, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 110 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

To provide for persistent storage of information such as data, applications, one or more operating systems and so forth, a mass storage 120 may also couple to processor 110. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 4, a flash device 122 may be coupled to processor 110, e.g., via a serial peripheral interface (SPI). This flash device may provide for non-volatile storage of system software, including a basic input/output software (BIOS) as well as other firmware of the system.

Various input/output (IO) devices may be present within system 100. Specifically shown in the embodiment of FIG. 4 is a display 124 which may be a high definition LCD or LED panel configured within a lid portion of the chassis. This display panel may also provide for a touch screen 125, e.g., adapted externally over the display panel such that via a user's interaction with this touch screen, user inputs can be provided to the system to enable desired operations, e.g., with regard to the display of information, accessing of information and so forth. In one embodiment, display 124 may be coupled to processor 110 via a display interconnect that can be implemented as a high performance graphics interconnect. Touch screen 125 may be coupled to processor 110 via another interconnect, which in an embodiment can be an I²C interconnect. As further shown in FIG. 4, in addition to touch screen 125, user input by way of touch can also occur via a touch pad 130 which may be configured within the chassis and may also be coupled to the same I²C interconnect as touch screen 125.

For perceptual computing and other purposes, various sensors may be present within the system and can be coupled to processor 110 in different manners. Certain inertial and environmental sensors may couple to processor 110 through a sensor hub 140, e.g., via an I²C interconnect. In the embodiment shown in FIG. 4, these sensors may include an accelerometer 141, an ambient light sensor (ALS) 142, a compass 143 and a gyroscope 144. Other environmental sensors may include one or more thermal sensors 146 which may couple to processor 110 via a system management bus (SMBus) bus, in one embodiment.

Also seen in FIG. 4, various peripheral devices may couple to processor 110 via a low pin count (LPC) interconnect. In the embodiment shown, various components can be coupled through an embedded controller 135. Such components can include a keyboard 136 (e.g., coupled via a PS2 interface), a fan 137, and a thermal sensor 139. In some embodiments, touch pad 130 may also couple to EC 135 via a PS2 interface. In addition, a security processor such as a trusted platform module (TPM) 138 in accordance with the Trusted Computing Group (TCG) TPM Specification Version 1.2, dated Oct. 2, 2003, may also couple to processor 110 via this LPC interconnect.

System 100 can communicate with external devices in a variety of manners, including wirelessly. In the embodiment shown in FIG. 4, various wireless modules, each of which can correspond to a radio configured for a particular wireless communication protocol, are present. One manner for wireless communication in a short range such as a near field may be via a near field communication (NFC) unit 145 which may communicate, in one embodiment with processor 110 via an SMBus. Note that via this NFC unit 145, devices in close proximity to each other can communicate. For example, a user can enable system 100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 4, additional wireless units can include other short range wireless engines including a WLAN unit 150 and a Bluetooth unit 152. Using WLAN unit 150, Wi-Fi™ communications in accordance with a given Institute of Electrical and Electronics Engineers (IEEE) 802.11 standard can be realized, while via Bluetooth unit 152, short range communications via a Bluetooth protocol can occur. These units may communicate with processor 110 via, e.g., a USB link or a universal asynchronous receiver transmitter (UART) link. Or these units may couple to processor 110 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 156 which in turn may couple to a subscriber identity module (SIM) 157. In addition, to enable receipt and use of location information, a GPS module 155 may also be present. Note that in the embodiment shown in FIG. 4, WWAN unit 156 and an integrated capture device such as a camera module 154 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 160, which may couple to processor 110 via a high definition audio (HDA) link. Similarly, DSP 160 may communicate with an integrated coder/decoder (CODEC) and amplifier 162 that in turn may couple to output speakers 163 which may be implemented within the chassis. Similarly, amplifier and CODEC 162 can be coupled to receive audio inputs from a microphone 165 which in an embodiment can be implemented via dual array microphones to provide for high quality audio inputs to enable voice-activated control of various operations within the system. Note also that audio outputs can be provided from amplifier/CODEC 162 to a headphone jack 164. Although shown with these particular components in the embodiment of FIG. 4, understand the scope of the present invention is not limited in this regard.

Embodiments may take advantage of a front end unit including an instruction fetch unit and a decoder to obtain and decode instructions. For example in some embodiments this unit may receive incoming macro-instructions (such as x86 instructions of a given ISA) and decode these instructions into one or more micro-operations (μops). In this way, the asymmetrical cores can move behind a first step decoder that can provide input of instructions to both the low power core and the high power core as appropriate.

Figure 5:
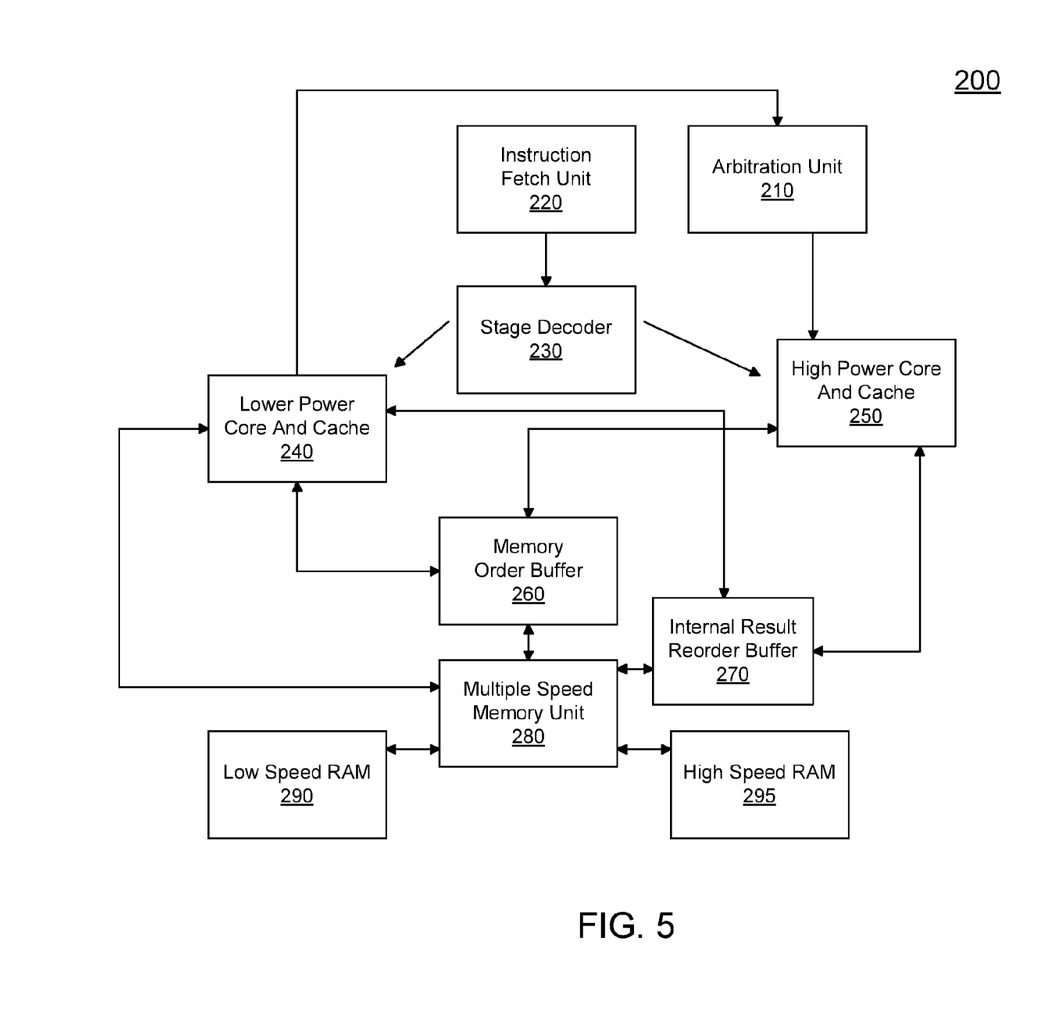
FIG. 5 is a block diagram of an asymmetrical processor in accordance with an embodiment of the present invention.

Referring now to FIG. 5, shown is a block diagram of an asymmetrical processor in accordance with an embodiment of the present invention. As shown in FIG. 5, processor 200 may include asymmetrical cores having at least one low power core and at least one higher power core. This processor may be a multicore processor fabricated on a single semiconductor die. For ease of discussion the embodiment of FIG. 5 is under the assumption that only a single low power core and a single higher power core are present. However, as will be described further below in other implementations multiple cores of each of these types can be present.

In the embodiment shown in FIG. 5, an arbitration unit 210 may be provided to control the enabling and disabling of a high power core 250 (also referred to herein as a second core). In general, the processor may be configured such that a low power core 240 (also referred to herein as a first core) may always operate when the processor has work to do. However, high power core 250 may be enabled only under certain workload conditions to maintain a relatively high level of processing capability while at the same time maintaining reduced power consumption. In general, arbitration unit 210 may operate to determine what workloads would benefit from powering up core 250.

Assume that the heterogeneous cores are of the same ISA or possibly of a reduced set of instructions of the same ISA. For example, first core 240 may correspond to a core having a micro-architecture of an Intel® Atom™ design and second core 250 can be of an Intel® Core™ design. However understand the scope of the present invention is not limited in this regard and in other embodiments, an asymmetric processor can include cores of a different design such as cores designed by AMD Inc. of Austin, Tex. or ARM-based cores available from ARM Holdings of Sunnyvale, Calif. For example, the higher power core may correspond to a Cortex™ A15 design, while the low power core can be of a Cortex™ A7 design. Or an AMP processor may include MIPS-based cores available from MIPS Technologies of Sunnyvale, Calif. Furthermore, as will be described below, embodiments can mix cores of different vendors/licensors and/or ISAs such as cores according to an x86 ISA and cores according to an ARM-based ISA. As another example, second core 250 can execute all instructions of an ISA, while first core 240, which may have a lesser number of architectural and micro-architectural resources including different/smaller register structures, execution units and so forth, can only execute a subset of the ISA. In this way, the different ISAs can partially overlap. In other embodiments, the ISAs to be handled by the different core types can be completely different, as enabled by the output of stage decoder 230.

Note that each of cores 240 and 250 may include or be associated with one or more levels of cache memory. Furthermore, in some implementations such as that of FIG. 5, these cores may not include all circuitry of a traditional core. That is, as certain front end circuitry is provided globally, the cores can be configured to not have such front end circuitry to avoid duplication of this circuitry and the associated real estate and power consumption expense.

Thus as seen in FIG. 5 processor 200 can include an instruction fetch unit 220 and a stage decoder 230. These front end units can be configured to fetch instructions for execution and to decode such instructions, which may be macro-instructions, into a series of one or more smaller instructions (e.g., μops) to be executed by the cores. Because these global units are provided to perform the instruction fetch and decoding operations outside of the cores 240 and 250, these cores can thus avoid having this circuitry.

Furthermore, note the presence of certain back end units on a global basis. Specifically, a memory order buffer 260 and an internal result reorder buffer 270 may be provided to receive and reorder results from the two different cores. In addition, these units may also be used in connection with the out-of-order processing performed by core 250. Thus again, certain circuitry that may be commonly found in a back end unit of a higher power out-of-order core can be avoided, further reducing real estate and power consumption. Buffers 260 and 270 serve to put out of order transactions back into order. Both memory and CPU operations could be acquired/retired out of order such that the buffer maintains operations in order. Memory order buffer 260 operates by issuing a series of memory fetch commands. Due to conflicts (such as from an IO device), a memory be slower than others. Instead of blocking (stopping) on the slower request, each request can be returned as the memory subsystem obtains it. The buffer allows ordering to be resolved. Whenever there are different speed devices or two different ordering devices, the buffer allows each to operate as fast as possible, by operating the buffer to keep the flow moving.

Still referring to FIG. 5, memory order buffer 260 and result reorder buffer 270 may be coupled to a multiple speed memory unit 280 which may act as a controller and arbitrator between the processor circuitry and a system memory, shown in the embodiment of FIG. 5 as a low-speed memory 290 and a high-speed memory 295. As such, memory unit 280 may be implemented as a memory controller for the system, and thus will also be referred to herein as a memory controller. In general, these different memories can be implemented as different memory devices, which can be individual memory packages, e.g., configured on a motherboard. Or in other embodiments these different memories each can be implemented as one or more memory modules or so-called sticks that can be configured onto sockets coupled to the motherboard.

In certain implementations, processor 200 may operate such that much of the circuitry may be normally powered off. In other words, both the larger, higher power core 250 and circuitry used by this core such as memory order buffer 260 and result reorder buffer 270 can also be powered off. As such only the lower power first core 240 and corresponding lower speed memory would be used. In this configuration, processor 200 may operate as a conventional in-order core such as an Intel® Atom™ processor (with the addition of the always running arbitration unit 210).

Once the second core is active, memory controller 280 can be used to move data back and forth between the high speed and low speed domains. In some embodiments the memory controller 280 may also include an offloaded ability to move data without direct core control. Since second core 250 performs speculative operations, memory order buffer 260 and reorder buffer 270 may be powered on whenever the second core is active in order to maintain data order integrity. Although not shown for ease of illustration, note that the front end units (or at least instruction fetch unit 220) may also have an interface to memory controller 280 since the instructions may be obtained from main memory.

Also for ease of illustration, not shown are connections between the arbitration unit 210 and memory controller 280 and low power core 240. Note that these connections may be made with minimal bandwidth, namely sufficient to message usage levels. When second core 250 is enabled, the direct memory controller-to-low power core messaging can be routed through memory order buffer 260 to maintain ordering between the two cores. That is, since first core 240 and second core 250 could both be working on memory at the same time, memory order buffer 260 may ensure that the right data order takes place, namely the order of fetch and retirement. Thus if core 240 is in need of data posted by core 250, the memory order buffer will be able to provide it the last good value if it is the posting buffer (rather than going to MSMU 280).

Note that in some embodiments instructions to selectively enable and disable selected ones of the core types can be provided. As an example, a compiler may generate specific instructions for turning on and off the second core. A start CPU command can include a pointer to the core to start executing. In this way, applications may route themselves to the second core and take advantage of the extra features in the high power core. In this case the background processing such as housekeeping tasks could be handled on the low power core. The more the software load is segregated between the two cores, the faster each core can run. And particular workloads can be directed to a given one of the core types. For example device drivers like an Ethernet driver may be controlled to only run on the low power core since it will always be running. Although shown at this high level in the embodiment of FIG. 5, understand the scope of the present invention is not limited in this regard. For example, in other embodiments there can be multiple low power cores and multiple high power cores.

Figure 6:
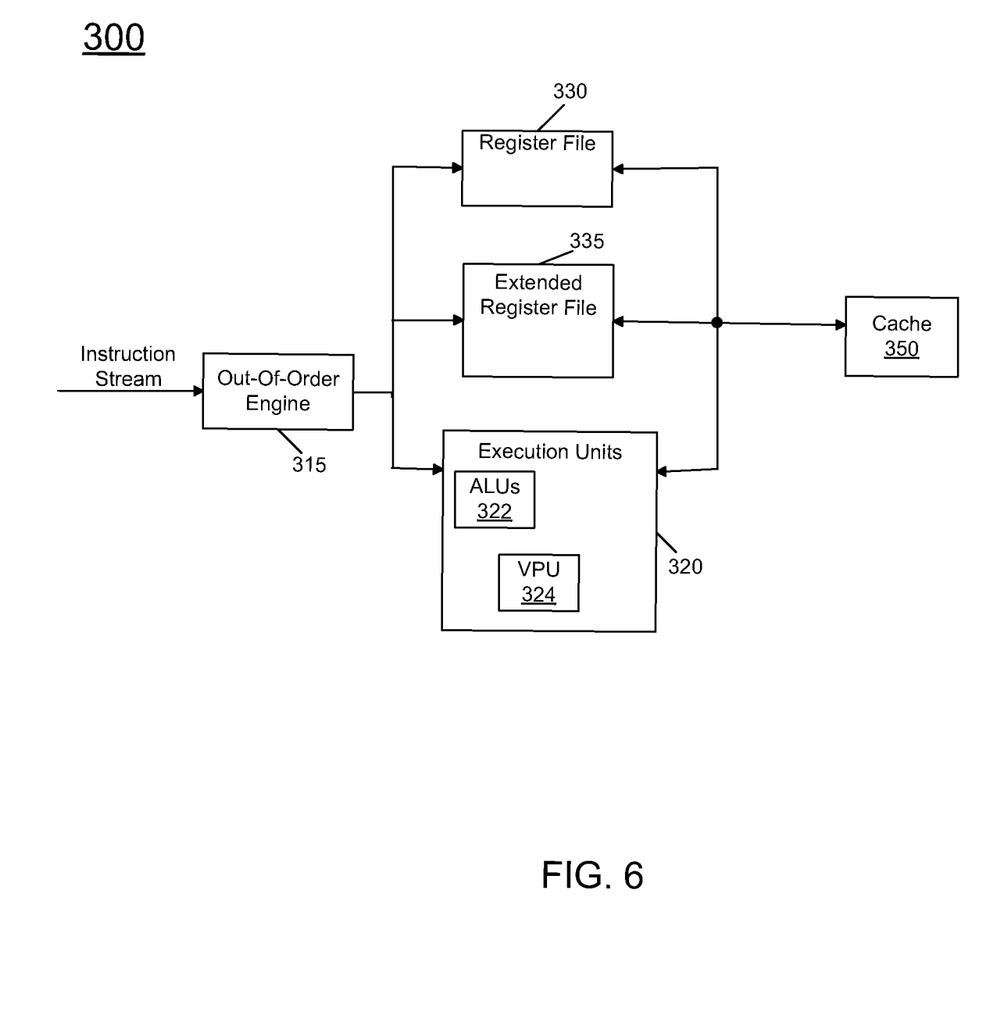
FIG. 6 is a block diagram of a processor core in accordance with one embodiment of the present invention.

Referring now to FIG. 6, shown is a block diagram of a processor core in accordance with one embodiment of the present invention. As shown in FIG. 6, processor core 300 may be a multi-stage pipelined out-of-order processor, and may correspond to second core 250 of FIG. 5. Processor core 300 is shown with a relatively simplified view in FIG. 6 to illustrate the arrangement of the core.

An out-of-order (OOO) engine 315 may be used to receive incoming instructions, e.g., an instruction stream (which may be in the form of micro-instructions) from the shared front end structures (not shown in FIG. 6), and to prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) or vector processing units (VPUs), among other specialized hardware. For example, such execution units may include one or more arithmetic logic units (ALUs) 322 and a VPU 224.

When operations are performed on data within the execution units, results may be provided externally from, e.g., to one or more of a result reorder buffer and a memory order buffer that can be shared with the low power core (not shown for ease of illustration in FIG. 6, but as shown in FIG. 5).

As shown in FIG. 6, the various units can be coupled to cache 350 which, in one embodiment may be a low level cache (e.g., an L1 cache). From cache 350, data communication may occur with higher level caches, system memory and so forth.

Note that while the implementation of the processor of FIG. 6 is with regard to an out-of-order machine such as of an x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Also understand that the core of FIG. 6 may be a large core, and a lesser number of components, widths, and so forth may be present in the low power core, which may be of an in-order architecture.

Figure 7:
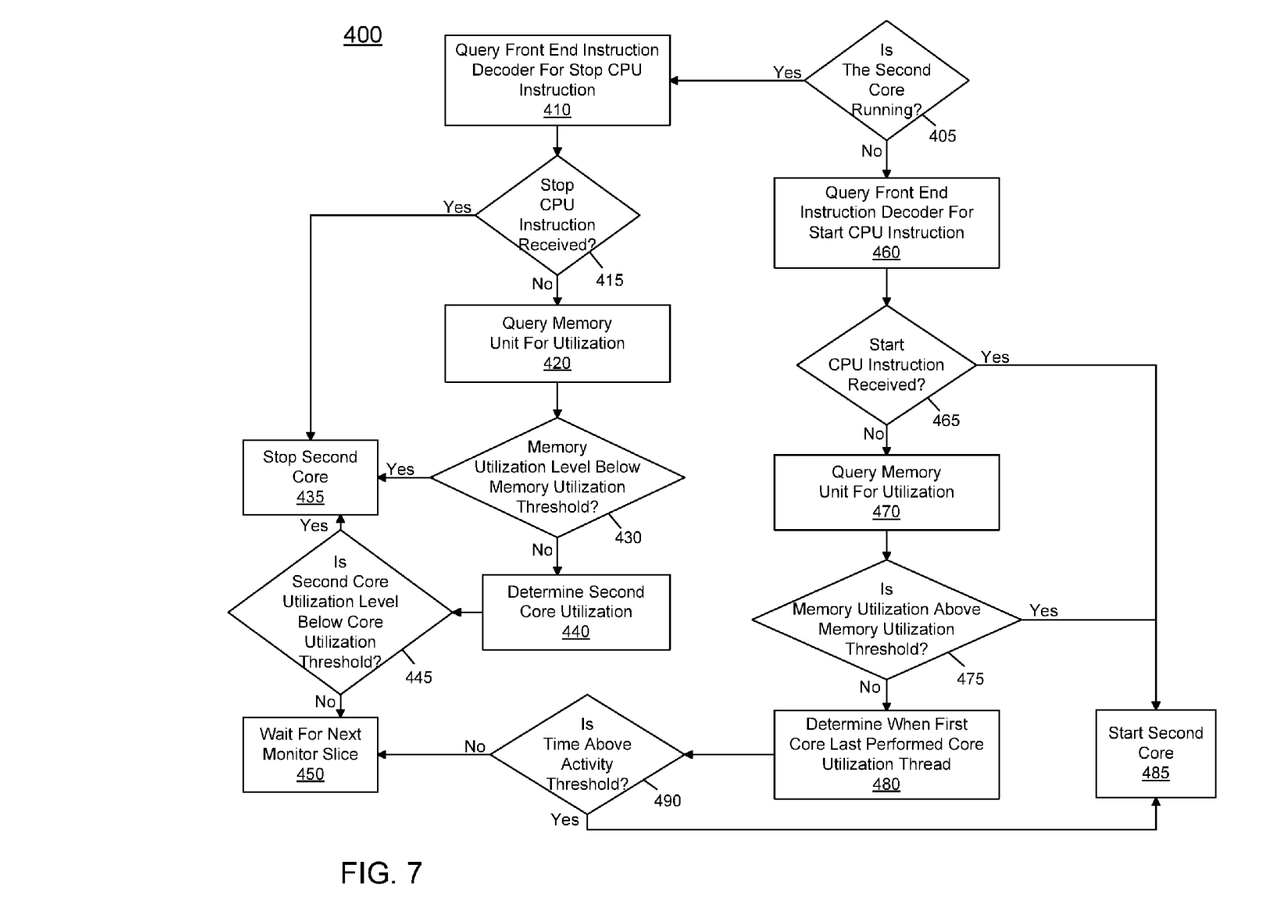
FIG. 7 is a flow diagram of a method of controlling an asymmetric processor in accordance with an embodiment of the present invention.

Referring now to FIG. 7, shown is a flow diagram of a method of controlling an asymmetric processor in accordance with an embodiment of the present invention. As shown in FIG. 7, method 400 can be performed by an arbitration unit or another controller or logic within the processor that has access to information of the various cores and can controllably select one or more of the cores to be active depending on the workload to be executed in the processor. Note that the embodiment shown in FIG. 7 is with regard to control of the high power core under the assumption that the low power core may always be controlled to be operating (when there is work to be done). However, the scope of the present invention is not limited in this regard, and in other embodiments method 400 shown in FIG. 7 may be performed for any of the cores of the asymmetric processor to determine whether the given core should be enabled or not, depending on workload and other conditions such as one or more constraints on the processor such as a thermal constraint, a power constraint, or so forth.

As seen in FIG. 7, method 400 can begin at diamond 405, where it can be determined whether the second core is running. For purposes of the discussion of FIG. 7, assume that the second core is a high power core and that the first core is a low power core. The determination of whether the second core is running can be achieved in different manners. In one embodiment, this determination can be based on an activity signal received in the arbitration unit from the second core, or it may be by querying whether various components such as the memory order buffer, multiple speed memory unit, and the storage decoder are performing operations for the second core.

Next, if it is determined that second core is running, control passes to block 410 where a front end instruction decoder can be queried to determine whether a Stop CPU instruction has been received. Note that this instruction may be an instruction of a given ISA that can be issued by an operating system (OS), virtual machine monitor (VMM) or application-level software to cause an identified core to be placed into a powered off state. In some embodiments, a start instruction may have the general form of Start CPU@Address1 and the stop instruction would be of the general form Stop CPU@Address1.

Thus it can be determined at diamond 415 whether this Stop CPU instruction has been received. If not, control passes to block 420 where a memory unit can be queried for its utilization level. In an embodiment, this query can be realized by a query message sent from the arbitration unit to a memory controller such as multiple speed memory unit 280 of FIG. 5. Although the scope of the present invention is not limited in this regard, in some embodiments this memory utilization determination can take into account the bandwidth on the memory interconnect to the high-speed memory.

Still referring to FIG. 7, next at diamond 430 it can be determined whether the memory utilization level is below a given memory utilization threshold. Note that this threshold can be set, e.g., by basic input output system (BIOS), in one embodiment. As examples, this threshold may be less than approximately 30%. If the utilization level is below this threshold, control passes to block 435 where the second core may be stopped (and on the further condition, in some embodiments that the first memory has available utilization). The operations performed in causing the second core to be stopped may include in one embodiment stopping the flow of new instructions from the stage decoder to the core and allowing currently pending instructions to be retired. Note that block 435 is also where control passes from diamond 415 when it is determined that a Stop CPU instruction has been received. This instruction may include an address that matches an address of a prior start CPU instruction to ensure that the correct thread is stopped.

Otherwise if the memory utilization level is not below this memory utilization threshold, control passes from diamond 430 to block 440 where the core utilization level for this second core can be determined. This determination can be made via a query message from the arbitration unit to the second core to determine its utilization level. As examples, the utilization level can be determined based on information present in a performance monitoring unit of the core, such as one or more counters associated with the execution and retirement of instructions, or other such metrics. Control next passes to diamond 445 where it can be determined whether this core utilization level of the second core is less than a given core utilization threshold, which again may be configured, e.g., via BIOS. This core utilization threshold may be less than approximately 33%, in one embodiment. Note that this threshold can be determined by usage case testing. If the core utilization level is below this core utilization threshold, control passes to block 435, discussed above to cause the second core to stop (and on the further condition, in some embodiments that the first core has available utilization). Otherwise, the analysis with respect to this monitoring may conclude at block 450, and the arbitration unit may wait for a next monitor slice to again perform the analysis to determine whether to disable (or enable) the second core. Note that in some embodiments the duration of the monitor slices may be configurable.

Note that processing proceeds in a generally like manner in method 400 for analysis when the second core is inactive, but in an inverse way to determine whether utilization is sufficient to warrant the power consumption of the second core. Thus if at diamond 405 it is determined that the second core is not running, control passes to block 460, where the front end instruction decoder can be queried for a start CPU instruction. If such instruction is received, control passes to block 485 where the second core can be started.

If no Start CPU instruction was received, control passes from diamond 465 to block 470 where the memory unit can be queried for its utilization. However, in this situation rather than querying regarding use of the high-speed memory, instead the determination can be with regard to the utilization of the low-speed memory. Next, at diamond 475 it can be determined whether the memory utilization is above a memory utilization threshold. If so, control passes to block 485 to begin the second core. Note that this memory utilization threshold may be set at a different lower level than the memory utilization threshold described above, to avoid undesired switching on and off of the high power core.

Otherwise, if at diamond 475 it is determined that the low-speed memory utilization is below this threshold, control passes to block 480 where it can be determined the last time that the first core executed a core utilization thread, such as a deadman thread that is periodically run to ensure that the core is not suffering from a deadlock or insufficient processing resources. Control next passes to diamond 490 where it can be determined whether the time since the last execution of this thread is greater than an activity threshold. If not, no action is taken and control passes to block 450, discussed above. Otherwise, if the time is greater than this threshold, meaning that the first core is unable to timely execute this thread due to its current workload, control passes to block 485 where the second core can be enabled to begin operations. Note that while shown in FIG. 7 with the illustrated metrics to determine when to enable/disable the second core, understand that other such metrics may be used. Also, although shown at this high level in the embodiment of FIG. 7, additional control operations are possible. For example, the arbitration unit may decide to turn on the high speed memory for use by the lower power core. Still further, in cases where the second core is initiated responsive to a Start CPU instruction, the flow may be modified to cause this core to be powered down only responsive to a Stop CPU instruction (and where both of these instructions are associated with the same thread).

Embodiments may thus enable various portable systems such as a battery powered system to achieve power performance advantages. As a result, the user experience can benefit from having the power of an advanced out-of-order core, but the life span of the battery can be extended by an in-order core. Note that different, even older generations of processor cores can be included in a design to enable use of a multicore processor in even lower power devices. For example, the low power core could be a 486-based design and the high power core could be an Intel® Atom™-based design. And as mentioned above, it is also possible to mix cores of different vendors. For example, x86-based cores can be provided on a single die along with ARM-based cores. As examples, the one or more large cores may be of an Intel® Core™ design and the one or more small cores may be of an ARM Cortex™ design. However, in other embodiments the large cores may be ARM-based and the small cores may be x86-based.

Figure 8:
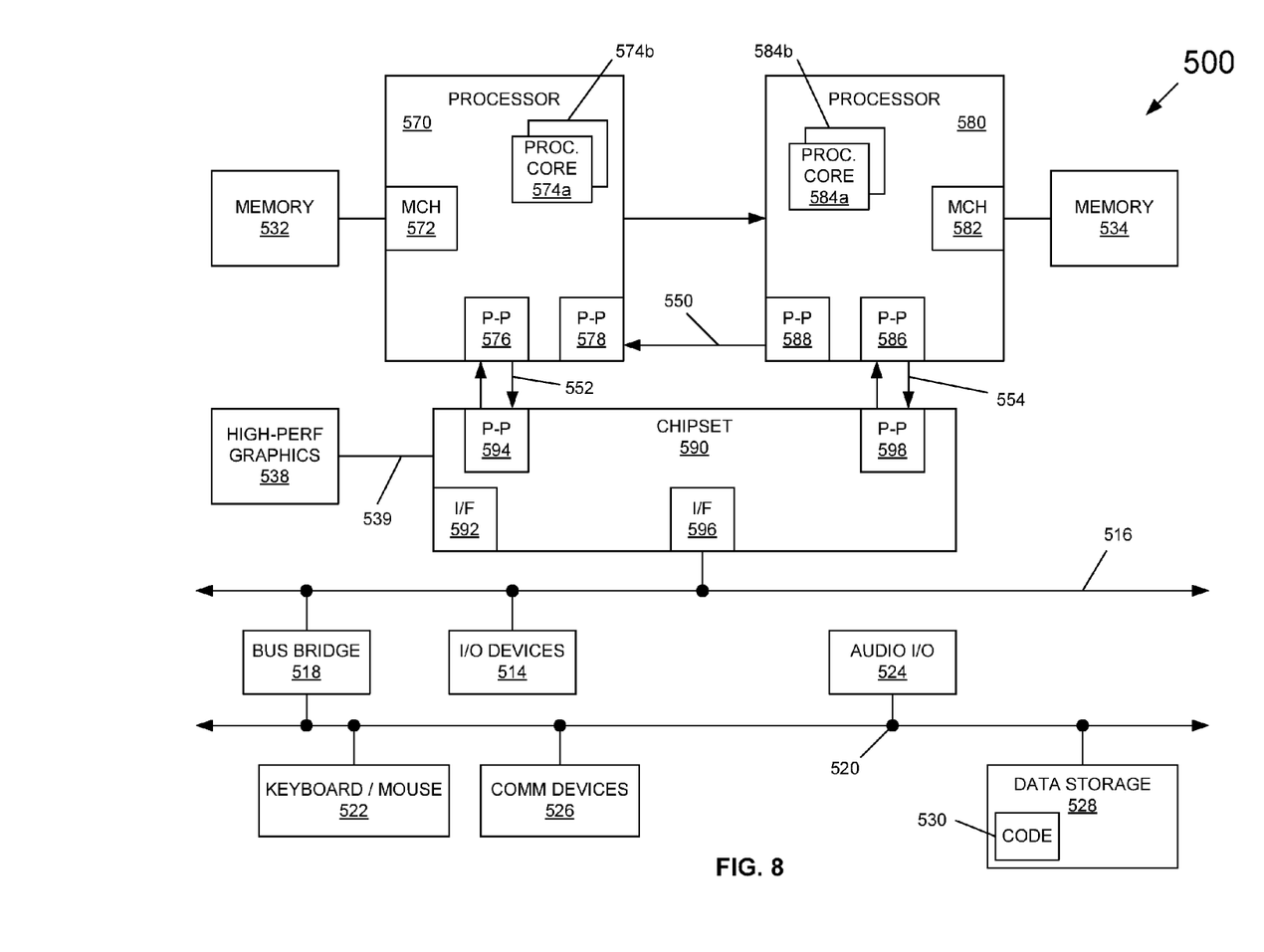
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574*a* and 574*b* and processor cores 584*a* and 584*b*), although potentially many more cores may be present in the processors. Each of the processors can include at least one of a large and small core, along with a controller to selectively enable the large core only as needed as described herein. In other embodiments, first processor 570 may have multiple low power cores such as multiple Intel® Atom™ cores, while second processor 580 may have multiple high power cores such as multiple Intel® Core™ or Xeon™ family cores.

Still referring to FIG. 8, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 8, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 8, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 8, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. For example, a lower performance (and thus low power) video graphics engine (like engine 538) that could be turned on much like the higher power core 250. Also interconnects may change speeds depending on the operating cores. Note that a cascade of the processor decision could have similar actions in items in the system, e.g., in a server, the whole system infrastructure speeds could be throttled. Embodiments can be incorporated into other types of systems including mobile devices such as a smart cellular telephone, tablet computer, netbook, or so forth.

While embodiments may be in silicon, certain embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a fetch unit to fetch instructions;
   a decode unit to decode the fetched instructions into decoded instructions;
   a first core coupled to the decode unit to independently execute at least some of the decoded instructions, the first core to operate at a first power consumption level;

a second core coupled to the decode unit to independently execute at least some of the decoded instructions, the second core to operate at a second power consumption level greater than the first power consumption level, the second core heterogeneous from the first core;

a memory order buffer and a result reorder buffer coupled to the first core and the second core; and an arbitration logic coupled to the first and second cores to control enablement of the second core.

2. The processor of claim 1, wherein the arbitration logic is to cause the second core to begin execution responsive to a start processor instruction and to cause the second core to enter into a low power state responsive to a stop processor instruction.

3. The processor of claim 1, wherein the first core comprises an in-order core and the second core comprises an out-of-order core.

4. The processor of claim 1, further comprising a memory controller to interface with a first memory device to be used by the first core and a second memory device to be used by the second core.

5. The processor of claim 4, wherein the first memory device is to operate at a first speed and the second memory device is to operate at a second speed.

6. The processor of claim 4, wherein the arbitration logic is to maintain the second core powered on if a memory utilization level of the second memory device is greater than a memory utilization threshold.

7. The processor of claim 4, wherein the arbitration logic is to maintain the second core powered on if a core utilization level of the second core is greater than a core utilization threshold.

8. The processor of claim 7, further comprising a plurality of first cores including the first core and a plurality of second cores including the second core, and wherein each of the plurality of second cores includes a back end unit including a memory order buffer.

9. The processor of claim 1, wherein the memory order buffer and the result reorder buffer are further coupled to a memory controller to interface with a first memory device to be used by the first core and a second memory device to be used by the second core, wherein the first memory device is to operate at a first speed and the second memory device is to operate at a second speed.

10. The processor of claim 9, wherein the multicore processor includes the first and second cores, the memory order buffer, the result reorder buffer and the memory controller configured on a single semiconductor die.

11. The processor of claim 10, wherein the first core and the second core are separate from the decode unit, the memory order buffer, and the result reorder buffer.

12. A non-transitory machine-readable medium having stored thereon instructions, which if performed by a machine cause the machine to perform a method comprising:

querying, via an arbitration unit of a multicore processor including a first core having a first power consumption level and a second core having a second power consumption level greater than the first power consumption level, a memory controller of the multicore processor coupled to a first memory device to be used by the first core and a second memory device to be used by the second core, for a memory utilization level of the second memory device;

determining whether the memory utilization level is less than a memory utilization threshold; and if so, causing the second core to enter into a low power state while maintaining the first core powered on.

13. The non-transitory machine-readable medium of claim 12, wherein the method further comprises causing the second core to enter into the low power state responsive to a stop processor instruction received and decoded in a front end unit of the multicore processor while maintaining the first core powered on.

14. The non-transitory machine-readable medium of claim 13, wherein the method further comprises inserting the stop processor instruction into an instruction stream via a compiler.

15. The non-transitory machine-readable medium of claim 12, wherein the method further comprises:

determining whether a core utilization level of the second core is less than a core utilization threshold; and if so, causing the second core to enter into the low power state while maintaining the first core powered on.

16. The non-transitory machine-readable medium of claim 12, wherein the method further comprises:

if the second core is in the low power state, determining whether a memory utilization level of the first memory device is above a memory utilization threshold for the first memory device; and if so, causing the second core to be powered on.

17. The non-transitory machine-readable medium of claim 12, wherein the method further comprises:

if the second core is in the low power state, determining whether a time period since the first core last executed a core utilization thread is greater than an activity threshold; and if so, causing the second core to be powered on.

18. A system comprising:

a multicore processor including a front end unit having a fetch unit to fetch instructions and a decode unit to decode the fetched instructions into decoded instructions, a first core coupled to the decode unit to independently execute at least some of the decoded instructions, the first core to operate at a first power consumption level, a second core coupled to the decode unit to independently execute at least some of the decoded instructions, the second core to operate at a second power consumption level greater than the first power consumption level and heterogeneous from the first core, wherein the first core comprises an in-order pipeline and not including a fetch unit or a decode unit and the second core comprises an out-of-order pipeline and not including a fetch unit, a decode unit or a reorder buffer, and a memory controller to interface with a first memory device to be used by the first core and a second memory device to be used by the second core;

the first memory device coupled to the multicore processor to operate at a first speed; and the second memory device coupled to the multicore processor to operate at a second speed.

19. The system of claim 18, wherein the multicore processor further includes an arbitration unit to determine if a memory utilization level of the second memory device is less than a memory utilization threshold for the second memory device, and if so to cause the second core to enter into a low power state while maintaining the first core powered on, the arbitration unit further to power on the second core if a memory utilization level of the first memory device is above a memory utilization threshold for the first memory device or if a time period since the first core last executed a core utilization thread is greater than an activity threshold.

20. The system of claim 19, wherein the arbitration unit is to determine whether a core utilization level of the second core is less than a core utilization threshold, and if so, to cause the second core to enter into the low power state while maintaining the first core powered on.

* * * * *